United States Patent [19]

Whitfill

[11] 3,962,099

[45] June 8, 1976

[54] WATER BASE DRILLING MUD COMPOSITION

[75] Inventor: Donald L. Whitfill, Ponca City, Okla.

[73] Assignee: Continental Oil Company, Ponca City, Okla.

[22] Filed: Apr. 29, 1974

[21] Appl. No.: 465,027

[52] U.S. Cl. ............................ 252/8.5 A; 175/66; 252/8.5 B; 252/8.55 R
[51] Int. Cl.² ...................... C09K 7/02; C09K 7/04
[58] Field of Search ........... 252/8.5 A, 8.5 B, 8.5 R, 252/8.55 R; 175/66; 423/308, 309

[56] References Cited
UNITED STATES PATENTS

| | | | |
|---|---|---|---|
| 2,802,783 | 8/1957 | Weiss et al............................ | 252/8.5 |
| 2,856,355 | 10/1958 | Weiss et al............................ | 252/8.5 |
| 2,868,726 | 1/1959 | Brukner et al........................ | 252/8.5 |
| 3,084,121 | 4/1963 | Wiener................................. | 252/8.5 |

OTHER PUBLICATIONS

Clark, Article in Journal of Physical Chemistry, vol. 35, 1931, pp. 1232–1238.

The Condensed Chemical Dictionary, Sixth Edition, 1966, p. 205.
Handbook of Chemistry and Physics, 46th Edition, 1965–1966, pp. B162 and B163.

*Primary Examiner*—Herbert B. Guynn
*Attorney, Agent, or Firm*—Bayless E. Rutherford, Jr.

[57] ABSTRACT

An improved water base drilling mud composition wherein calcium ions are controlled and converted to water-insoluble plant nutrient compounds by the use of monocalcium phosphate compounds, said composition comprising an aqueous suspension containing from about 5 to 35 pounds per barrel of a clay material, from about 1 to 5 pounds per barrel of an alkaline earth metal hydroxide selected from the group consisting of calcium hydroxide and mixtures of calcium hydroxide and barium hydroxide, and at least a stoichiometric amount, based on the weight of said alkaline earth metal hydroxide of said monocalcium phosphate containing compound.

8 Claims, No Drawings

3,962,099

WATER BASE DRILLING MUD COMPOSITION

FIELD OF THE INVENTION

This invention relates to drilling mud compositions. In one aspect this invention relates to water base drilling mud compositions which can be disposed of on the drilling site. In yet another aspect this invention relates to novel water base drilling mud compositions in which the calcium ion concentration of said mud compositions is controlled and converted to water-insoluble plant nutrient compounds by the use of monocalcium phosphate.

GENERAL BACKGROUND

Drilling muds have long been used in drilling processes. Universally, a drilling mud is used in a circulating system with a rotary well drilling mechanism. The drilling mud is forced down hole by pumping it down the hollow drill stem through the bit so that it lubricates and cools the bit. Then, the mud is circulated back to the surface and to a settling pit. The drilling mud washes out the cuttings which have been made from the hole, and the cuttings are carried outside the drill stem to the surface where the coarse particles are caused to be removed and the mud again used in a continuous circulating process. To prevent the loss of the mud in porous strata, the mud must be of a character to seal off such strata and the mud, by its hydrostatic pressure, must prevent the escape of gas, that is, prevent the well from blowing out. To provide the proper hydrostatic pressure, the specific gravity of the mud may be increased by adding heavier material than clay. On the other hand, the drilling fluid must have the proper viscosity, that is, be thick enough to carry out the cuttings, but thin enough to be pumped and to allow the coarse particles to settle out in the surface mud pits so that the mud may be reused.

Until recent years, a drilling mud was thought to be useable and practical if it possessed desirable gel strength, viscosity and water loss properties. However, the disposal of drilling muds or fluids has gradually become an area of prime importance. Such has resulted from potential surface pollution. Restrictions on the disposal of drilling fluids are becoming more stringent thereby substantially increasing the cost of disposal of such fluids. The industry is faced with the probability of additional governmental regulations in regard to the disposal of drilling mud or fluids with a resultant increase in cost. Therefore, much effort has been directed in developing drilling muds or fluids which can be disposed of onsite without creating pollution problems such as soil or plant damage. At the same time, the drilling muds or fluids must still possess the desired physical properties as to viscosity, gel strength, and the like.

PRIOR ART

A prior art search was conducted on the concept of the invention. Twenty one patents were reviewed and of these, the following are considered typical of the prior art.
U.S. Pat. No. 2,935,473
U.S. Pat. No. 2,713,030
U.S. Pat. No. 3,713,031
U.S. Pat. No. 3,079,334
U.S. Pat. No. 3,079,335

U.S. Pat. No. 2,935,473 discloses that excess calcium ion concentration in bentonite base drilling muds is undesirable as calcium bentonite formed by an excess concentration results in greater agglomeration of the particles and precipitation resulting in decreased viscosity and gel strengths as well as increased fluid loss. Treatment for such deterioration of drilling mud properties involves addition of a salt such as sodium phosphate which reacts with the excess calcium ions to form an insoluble precipitate, thus effectively removing the excess calcium ions from the drilling mud environment.

U.S. Pat. No. 2,713,030 and U.S. Pat. No. 2,713,031 disclose the use of various alkali metal molecularly dehydrated phosphates such as sodium acid pyrophosphate, sodium metaphosphate, tetrasodium pyrophosphate, and the like, which are characterized by their ability to revert to the orthophosphate form in the presence of water, as additives for drilling mud.

U.S. Pat. No. 3,079,334 and U.S. Pat. No. 3,079,335 disclose that polyphosphates such as sodium tetraphosphate, sodium hexametaphosphate, sodium tripolyphosphate, and other alkali metal polyphosphates are added to calcium-based drilling muds.

OBJECTS OF THE INVENTION

An object of the present invention is to provide improved water base drilling muds. Another object of the present invention is to provide stable, non-dispersive, easily disposable water base drilling muds.

Yet another object of the invention is to provide suitable water base drilling muds that can be disposed of on-site with substantially no soil or plant damage. These and other objects and features of the present invention will readily be apparent to those skilled in the art from a reading of the following detailed description of the invention.

SUMMARY OF THE INVENTION

According to the present invention, I have discovered novel drilling mud compositions having good rheological properties in which the concentration of calcium ions present in said mud compositions is controlled and converted to water-insoluble plant nutrient compositions by the use of monocalcium phosphate.

Broadly, the drilling mud compositions comprise an aqueous suspension containing from about 5 to 35 pounds per barrel of a clay material, from about 1 to 5 pounds per barrel of an alkaline earth metal hydroxide selected from the group consisting of calcium hydroxide and mixtures of calcium hydroxide and barium hydroxide, and at least a stoichiometric amount, based on the weight of said alkaline earth metal hydroxide, of a monocalcium phosphate containing compound.

DETAILED DESCRIPTION OF PREFERRED EMBODIMENTS

As previously stated, drilling mud compositions have long been employed with rotary well drilling means. Slaked lime containing drilling muds, such as lime muds and low lime muds, have been widely used because of their good rheological properties. However, when using such mud systems caustic, such as sodium hydroxide, has been employed to control the calcium ion concentration. Such has resulted in drilling mud compositions having a high pH level and thus high levels of soluble salts which are damaging to soil and plants. Further, when caustic is employed to control the calcium ion concentration of lime containing drilling muds, jelling of the drilling mud composition can occur when high temperature zones in the formation are encountered.

I have now discovered improved alkaline earth metal hydroxide containing drilling mud compositions which do not suffer from such disadvantages but which, in addition to having equal or better rheological properties, can readily be disposed of at the drilling site without damage to the soil or plant life. Further, since the novel drilling mud compositions can be formulated with lower hydroxide concentrations the compositions can be used as packer fluids, even when high temperatures are encountered.

The novel water base drilling mud compositions of the present invention comprise an aqueous suspension of a clay material, an alkaline earth metal hydroxide, and a monocalcium phosphate containing compound. Further, when desirable, additional constituents such as alkali metal hydroxide, mud thinners and fluid loss additives can be incorporated into the drilling mud compositions. The amount of each constituent can vary widely, depending in a large measure upon the properties of the formation being drilled, but generally the compositions will contain from about 5 to 35 pounds per barrel of said clay material, preferably from about 10 to 25 pounds per barrel, from about 1 to 3 pounds per barrel of said alkali metal hydroxide, from about 1 to 5 pounds per barrel of said alkaline earth metal hydroxide and from about 1 to 25 pounds per barrel of said monocalcium phosphate containing compound. One feature of utmost importance is the amount of monocalcium phosphate containing compound employed. Such will be dependent upon the amount of alkaline earth metal hydroxide constituent employed. It is important that at least a stoichiometric amount of the monocalcium phosphate containing compound, based on the amount of alkaline earth metal hydroxide, be employed. However, especially desirable results are obtained when the weight ratio of monocalcium phosphate containing compound and alkaline earth metal hydroxide are from about 5:1 to 1:1 respectively. For most applications the amount of monocalcium phosphate containing compound will be present in an amount of from about 2 to 5 pounds per barrel.

The various amounts of ingredients employed in the novel drilling mud compositions may be in a concentration greater than those stated as long as the ratio of the monocalcium phosphate containing compound and the alkaline earth metal hydroxide component is maintained within the stated range. However, no appreciable benefit is produced by the presence of amounts over that needed to maintain the desired rheological properties of the drilling mud compositions.

As previously stated, the amount of alkali metal hydroxide employed in the drilling mud composition will generally range from about 1 to 3 pounds per barrel. The amount will be dependent upon the pH desired for the total mud compsition. Generally, the above stated range will provide a pH of from about 9 to 14.

The constituents of the water base drilling mud compositions of the present invention, with the exception of the monocalcium phosphate containing compound, are those generally employed in the production of the prior art slaked lime drilling muds. Thus, any suitable clay material, such as prehydrated bentonite, or the like, can be employed as the clay constituent.

The alkaline earth metal constituent employed in the novel composition is selected from the group consisting of calcium hydroxide and mixtures of calcium hydroxide and other alkaline earth metal hydroxides, such as barium hydroxide. As is evident, calcium hydroxide is always required, either singularly or in combination with other alkaline earth metal hydroxides. As previously stated, it is, at times, desirable to employ an alkali metal hydroxide, in combination with the alkaline earth metal hydroxide. In such instances any suitable alkali metal hydroxide can be employed such as sodium hydroxide, potassium hydroxide, lithium hydroxide, and mixtures of same.

The monocalcium phosphate containing consituent employed in the novel drilling mud compositions is selected from the group consisting of monocalcium phosphate, a mixture of monocalcium phosphate and calcium sulfate. When the monocalcium phosphate containing constituent is a mixture of monocalcium phosphate and calcium sulfate, such compounds are present in an amount of from about 40–60 to 60–40 weight percent, respectively.

When it is determined that, due to formation properties, mud thinners and/or fluid loss additives are desired in the drilling mud composition, such can readily be incorporated. Such mud thinners and fluid loss additives are well known in the art. The amount of mud thinners and/or fluid loss additives will vary widely depending upon the viscosity of the drilling mud composition and the physical characteristics of the formation being drilled. Generally, however, when it is determined that mud thinners are desired, such will be incorporated in an amount of from about 1 to 20 pounds per barrel. The amount of fluid loss additive, when such is required, will vary broadly in an amount of from about 1 to 20 pounds per barrel, and more generally from about 1 to 5 pounds per barrel.

Examples of suitable mud thinners are ferrochrome lignosulfonates, lignins, tannins, and the like. Examples of suitable fluid loss additives are starch, caustic treated starch, carboxymethyl cellulose, and mixtures of same.

In order to more fully describe the invention the following Example is set forth. However, it is to be understood that such Example is provided for illustrative purposes only and it will be appreciated by those skilled in the art that numerous modifications in amounts of materials, conditions and equivalent materials may be made without departing from the scope of the present invention as disclosed herein.

EXAMPLE I

A series of experiments were conducted in which various drilling mud compositions were prepared for comparison of their rheological properties. Each of the samples prepared were made using prehydrated bentonite and tap water having a total salt content of 582 mg/l. The mud samples investigated were mixed in 5 barrel equivalent lots. (1 barrel equivalent = 350 ml.) A bench size LIGHTNIN Model F mixer was used to mix the samples in a baffled 3,000 ml stainless steel beaker. A six-bladed turbine (blades 90° to the verticle) mixing shaft was used on the mixer.

The rheological properties of the various drilling mud compositions were measured at room temperature (~75°F) on a FANN Model 35 viscometer. Fluid loss data were collected using a FANN filter press at room temperature and using 100 psi applied pressure. The pH values were measured on a digital pH meter using a platinum bridge electrode. The results of these experiments are given in the following table.

|  | Lime Mud (1) | Low Lime Mud (2) | MonoCalcium (3) Phosphate Containing Mud |
| --- | --- | --- | --- |
| pH | 13.1 | 13.1 | 12.6 |
| Apparent Viscosity (600 rpm reading/2) | 44 | 57 | 10 |
| Plastic Viscosity | 33 | 40 | 9 |
| Yield Point | 22 | 34 | 2 |
| 0 Gel | 3 | 4 | 1 |
| 10 Gel | 20 | 15 | 10 |
| API Fluid Loss Test, cc | 15.5 | 17.0 | 17.0 |
| Weight (pounds per gallon) | 8.75 | 8.7 | 8.7 |

(1) Formulation and order of addition in preparation of Lime Mud.
    20 ppb* prehydrated bentonite
      2 ppb LIGNOX (a lignin mud thinner)
      2 ppb NaOH
      5 ppb slaked lime
      1 ppb starch (fluid loss additive)
      1 ppb LIGNOX (2) Formulation and order of addition in preparation of Low Lime Mud.
    20 ppb prehydrated bentonite
      1 ppb LIGNOX (a lignin mud thinner)
      1 ppb NaOH
      1 ppb slaked lime
      1 ppb starch (a fluid loss additive)
      1 ppb LIGNOX (3) Formulation and order of addition in preparation of monocalcium phosphate containing mud.
    20 ppb prehydrated bentonite
      5 ppb monocalcium phosphate
    1.5 ppb slaked lime
    1.6 ppb NaOH Note — *ppb —pounds per barrel.

Upon review of the data set forth above, it is readily apparent that the drilling mud composition containing the calcium phosphate constituent has equivalent or better rheological properties than the conventional lime and low lime mud systems.

Further, calcium phosphate containing mud has a higher resistivity than the conventional lime and low lime mud systems. The resistivity is an indication of the soluble ion concentration of said system. For instance, the higher the resistivity the lower are the soluble ion concentrations and the lower the resistivity the higher the soluble ion concentration. The following table represents the effect of irrigation waters containing soluble ion concentrations, as measured by resistivity, on crops.

| | Resistivity | Effect on crops |
| --- | --- | --- |
| | 250 ohm | no injury |
| | 125 ohm cm | salt tolerant crops grow |
| | 66 ohm cm | nothing grows |

A series of experiments were conducted to determine the resistivity measurements of mud compositions, such being indicative of their disposal properties. These mud compositions were formulated in substantially the same manner as thos discussed in Table 1. The results of these experiments are set forth in Table II.

TABLE II

| | Mud Sample Formulation | Resistivity |
| --- | --- | --- |
| A. | 15 ppb prehydrated bentonite | 528Ωcm |
| | 1 ppb slaked lime 5 ppb monocalcium phosphate 2.4 ppb Ba(OH)$_2$ | |
| B. | 20 ppb prehydrated bentonite 1.5 ppb slaked lime 5 ppb monocalcium phosphate 1 ppb NaOH | 203Ωcm |
| C. | 10 ppb prehydrated bentonite 1 ppb slaked lime 5 ppb monocalcium phosphate 1 ppb fluid loss additive (starch) 1 ppb NaOH | 193Ωcm |
| D. | 15 ppb prehydrated bentonite 1 ppb slaked lime 5 ppb monocalcium phosphate 1.4 ppb KOH | 174Ωcm |
| E. | Conventional Low Lime Mud 20 ppb prehydrated bentonite 2 ppb ferrochrome lignosulfonate 1 ppb NaOH 2 ppb slaked lime 1 ppb starch — fluid loss additive | 62Ωcm |
| F. | Conventional Lime Mud 20 ppb prehydrated bentonite 3 ppb ferrochrome lignosulfonate 6 ppb slaked lime 1 ppb starch | 38Ωcm |

From the above data, based on resistivity measurements, it is readily apparent that the novel drilling mud compositions containing monocalcium phosphate and an alkaline earth metal hydroxide, such as Ca(OH)$_2$ or Ba(OH)$_2$ has greatly improved disposal properties.

EXAMPLE II

A second series of Experiments were conducted on a drilling mud composition prepared in accordance with the procedures of Example I with the exception that the mud composition contained only a clay material, ferrochrome lignosulfonate, an alkaline earth metal hydroxide and a monocalcium phosphate containing compound. The rheological properties of the various mud compositions were measured at room temperature (~75°F) on a FANN Model 35 viscometer. Fluid loss data were collected using a FANN filter press at room temperature and using 1000 psi applied pressure. The pH values were measured on a digital pH meter using a platinum bridge electrode. The results of these experiments are given in Table III.

|  | Lime Mud (1) | Lime Mud (2) | Lime Mud (3) | Lime Mud (4) | Lime Mud (5) |
| --- | --- | --- | --- | --- | --- |
| pH | 5.8* | 6.0* | 6.6* | 9.4 | 12.1 |
| Apparent Viscosity (600 rpm reading/2) | 7 | 7 | 7 | 13 | 16 |
| Plastic Viscosity | 6 | 6 | 6 | 10 | 12 |
| Yield Point | 1 | 2 | 3 | 5 | 7 |
| 0 Gel | 1 | 1 | 1 | 1 | 5 |
| 10 Gel | 3 | 3 | 4 | 8 | 14 |
| API Fluid Loss Test, cc. | 20.5 | 14.8 | 15.9 | 18.0 | 31.0 |
| Weight Ratio Monocalcium phosphate slaked lime | 5:1 | 4:1 | 3:1 | 2:1 | 1:1 |

Formulation and order of addition in preparation of Lime Mud Compositions.
(1)  20 ppb prehydrated bentonite
      1 ppb ferrochrome lignosulfonate
      0.4 ppb slaked lime
      2 ppb monocalcium phosphate (2)  20 ppb prehydrated bentonite
      1 ppb ferrochrome lignosulfonate
      0.5 ppb slaked lime
      2 ppb monocalcium phosphate (3)  20 ppb prehydrated bentonite
      1 ppb ferrochrome lignosulfonate
      0.66 ppb slaked lime
      2 ppb monocalcium phosphate (4)  20 ppb prehydrated bentonite
      1 ppb ferrochrome lignosulfonate
      1 ppb slaked lime
      2 ppb monocalcium phosphate (5)  20 ppb prehydrated bentonite
      1 ppb ferrochrome lignosulfonate
      2 ppb slaked lime
      2 ppb monocalcium phosphate

*When desired, an alkali metal hydroxide can be incorporated to increase the pH above 7.0.

From the above data it is readily apparent that the novel drilling mud composition containing a clay material, a mud thinner, an alkaline earth metal hydroxide and monocalcium phosphate possesses good rheological properties.

Having thus described the invention, I claim:

1. An improved water base drilling mud composition consisting essentially of an aqueous suspension of:
   a. from about 5 to 35 pounds per barrel of a clay material;
   b. from about 1 to 5 pounds per barrel of an alkaline earth metal hydroxide selected from the group consisting of calcium hydroxide and mixtures of calcium hydroxide and barium hydroxide; and
   c. at least a stoichiometric amount, based on the weight of said alkaline earth metal hydroxide, of monocalcium phosphate.

2. The drilling mud composition of claim 1 wherein said clay material is present in an amount of about 10 to 25 pounds per barrel.

3. The drilling mud composition of claim 1 which includes from about 1 to 20 pounds per barrel of a mud thinner constituent.

4. The drilling mud composition of claim 3 wherein said mud thinner constituent is selected from the group consisting of ferrochrome lignosulfonates, lignins, and tannins.

5. The drilling mud composition of claim 1 which includes from about 1 to 20 pounds per barrel of a fluid loss additive.

6. The drilling mud composition of claim 5 wherein said fluid loss additive is present in an amount of from about 1 to 5 pounds per barrel and said additive is selected from the group consisting of starch, caustic treated starch, carboxymethyl cellulose, and mixtures of same.

7. The drilling mud composition of claim 1 wherein said clay material is prehydrated bentonite; said alkaline earth metal hydroxide constituent is selected from the group consisting of Ca(OH)$_2$ and mixtures of Ca- $(OH)_2$ and other alkaline earth metal hydroxides; and, said monocalcium phosphate is present in a weight ratio with said alkaline earth metal hydroxide of from about 1:1 to 5:1.

8. The drilling mud composition of claim 7 wherein said prehydrated bentonite is present in an amount of about 15 pounds per barrel; said alkaline earth metal hydroxide is a mixture containing about 2.4 pounds per barrel of $Ca(OH)_2$; and, said monocalcium phosphate is present in an amount of about 5 pounds per barrel.

* * * * *